United States Patent [19]

Wilkie

[11] 4,005,602
[45] Feb. 1, 1977

[54] APPARATUS FOR MEASURING HIGH ALTITUDE TEMPERATURES

[76] Inventor: Wallace J. Wilkie, P.O. Box 3, 7465 Plymouth Road,, Ann Arbor, Mich. 48105

[22] Filed: Aug. 1, 1974

[21] Appl. No.: 493,513

[52] U.S. Cl. .............................. 73/170 R; 73/339 R
[51] Int. Cl.² .................... G01W 1/00; G01K 1/00
[58] Field of Search ......... 73/170 R, 339 R, 339 A, 73/340, 339 C, 560

[56] References Cited

UNITED STATES PATENTS

| | | | |
|---|---|---|---|
| 1,913,511 | 6/1933 | Reynolds | 73/170 R |
| 3,299,707 | 1/1967 | Niel | 73/339 A |
| 3,354,713 | 11/1967 | Sneed | 73/170 R |
| 3,420,100 | 1/1969 | DuBois | 73/170 R |
| 3,501,956 | 3/1970 | Yamaga | 73/339 A |
| 3,534,609 | 10/1970 | Grenfell | 73/339 |
| 3,566,689 | 3/1971 | Ringwall | 73/339 A |
| 3,595,082 | 7/1971 | Miller | 73/339 A |
| 3,609,731 | 9/1971 | Evans | 73/339 A |

OTHER PUBLICATIONS

Washington Star, May 7, 1952.
Sound Velocity as a Measurement of Gas Temp., Hedrich & Pardue.
"Temp.–Its Measurements & Control", vol. 2, 1955, pp. 383–392, Reinhold Pub. Copp.
Pub. Inst. of the Rocket–Grenade . . . Measuring Atm. Temp., Stroud et al., 5/55.

*Primary Examiner*—Harry N. Haroian
*Attorney, Agent, or Firm*—Olsen and Stephenson

[57] ABSTRACT

Apparatus for determining atmospheric temperature which provides for measurement of the speed of sound at a given altitude from which the derivative temperature at the same altitude can be calculated. In one form, the apparatus comprises a light and sound emitting device such as an explosive mechanism, a light signal receiver and a sound signal receiver supported a known distance from the light and sound emitting device, and a telemetry transmitter. Upon actuation, the light and sound emitting device simultaneously emits a light signal and a sound signal. The respective signals are received and transmitted to remote receivers and recorders. The measurement of the time lapse from reception of the light signal to reception of the sound signal is recorded whereupon the speed of sound and thus the derivative temperature at a particular altitude can be calculated by well known formulas. In another form of the invention two sound receivers are used spaced a known distance from each other. In still another form, the sound emitting and receiving devices are mounted side-by-side on a cord suspended from a parachute and the time required for sound to reflect off the parachute and travel back to the sound receiver is used to measure the speed of the sound. In yet another form, the difference in time required for the sound to travel through the cord and through the atmosphere is utilized.

3 Claims, 3 Drawing Figures

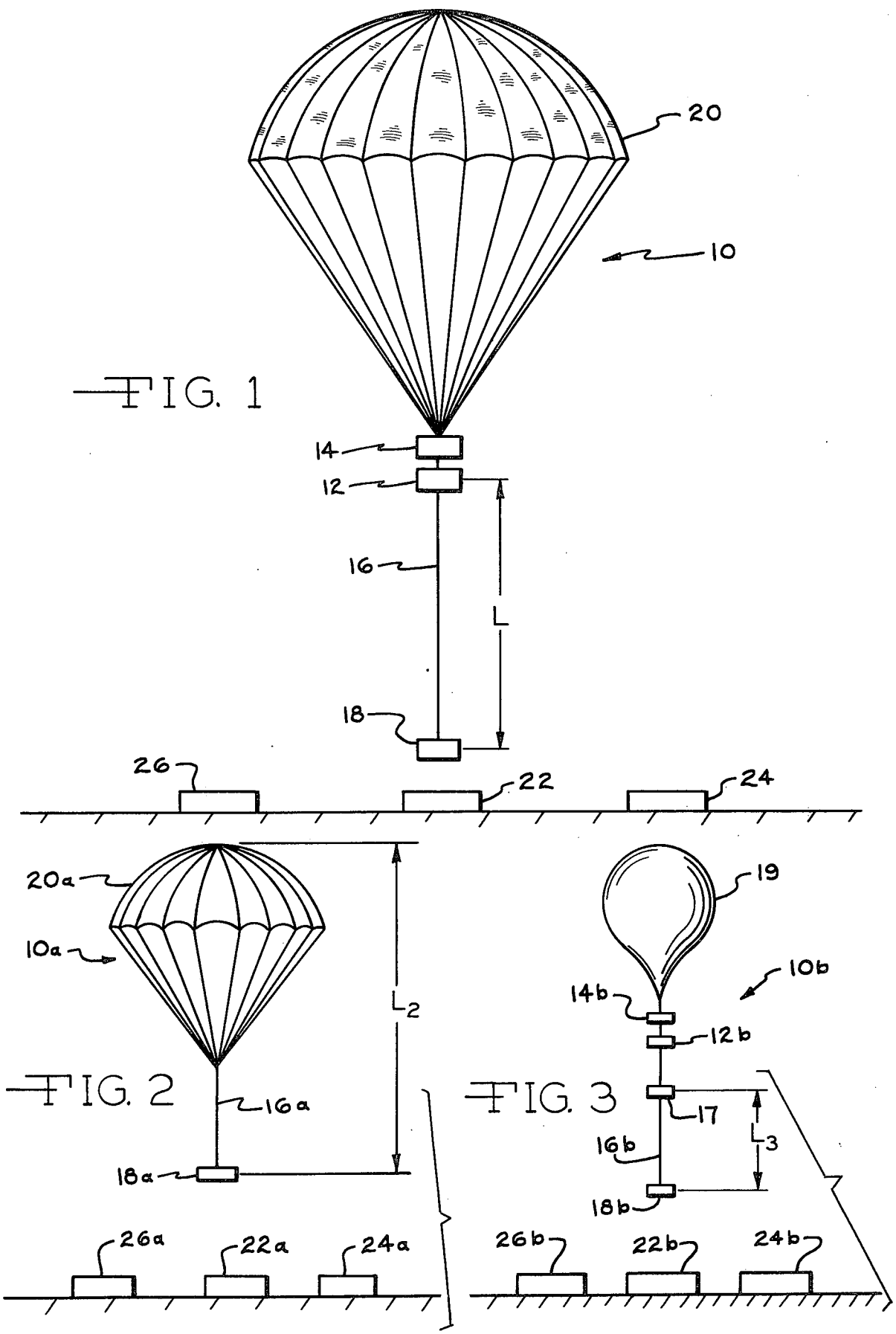

APPARATUS FOR MEASURING HIGH ALTITUDE TEMPERATURES

BACKGROUND OF THE INVENTION

The present invention relates to the determination of atmospheric temperature through measurement of the speed of sound in the particular portion of the atmosphere in which the temperature is to be determined. Previous systems for determining temperatures at very high altitudes have been complex, cumbersome, expensive or lacking in desired accuracy. It is an object of this invention, therefore, to provide apparatus which will yield temperature measurements at various altitudes in the atmosphere extending over a wide range of altitudes.

It is a further object of this invention to provide temperature measuring apparatus that is accurate, simple, compact and economical.

SUMMARY OF THE INVENTION

The present invention is directed to measurement of temperatures in the atmosphere at various altitudes. Apparatus is provided which measures the speed of sound thereby allowing the derivative temperature at various altitudes to be calculated.

In one form of the present invention, apparatus is provided for simultaneously emitting light and sound signals, reception of the light signal and the sound signal, and measurement of the time lapse between reception of these two signals. A telemetry transmitter transmits this information to receiving equipment remote from the apparatus where the reception of the respective signals is recorded.

In use, the apparatus is propelled to a high altitude in the atmosphere by a rocket, or the like, at which point the apparatus is ejected and a decelerator (parachute) deployed. After deployment, a series of simultaneous light and sound signals are triggered by a timer at selected time intervals. A light signal receiver and a sound signal receiver, located a fixed distance from the light and sound source receive the emitted light and sound signals. The telemetry transmitter transmits the reception to receiving equipment located away from the apparatus such as on the ground where the signals are recorded.

The time lapse between reception of the light signal and reception of the sound signal is measured. This time lapse represents the time taken for a sound signal to travel through the atmosphere the known distance between the sound source and the sound receiver. It is well known that from this information on sound speed, the derivative temperature can be calculated for the particular altitude.

In other forms of the invention, two sound receivers spaced a known distance from each other can be used to determine the speed of sound. Also, an aerostatic accelerator (balloon) can be used in place of the parachute. In still another form of the invention, the sound emitting and receiving devices are mounted side-by-side on a cord suspended from the parachute and the time required for sound to reflect off the parachute and travel back to the sound receiver is used to measure the speed of the sound. In yet another form, the difference in time required for the sound to travel through the cord and through the atmosphere is utilized.

Thus, in all of the disclosed forms of the invention apparatus is provided which will yield accurate information from various high altitudes.

Further objects, features and advantages of this invention will become apparent from a consideration of the following description, the appended claims and the accompanying drawing in which:

FIG. 1 is a diagrammatical elevation view of one form of the apparatus of the invention.

FIG. 2 is a diagrammatical elevation view of a modified form of the apparatus of this invention; and FIG. 3 is a diagrammatical elevation view of another modified form of the apparatus of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Referring now to the drawing, the invention will be described in greater detail. The temperature measuring apparatus of this invention, indicated generally at 10 in FIG. 1 consists of a device 12, such as a plurality of explosive charges, for setting off a series of simultaneous light and sound signals. A timer 14 triggers the charges at selected intervals providing for successive measurements throughout the descent of the apparatus. Supported a known distance L from device 12 by a cord 16 is a unit 18 which, among other functions, serves as a flash detector, sound signal receiver and telemetry transmitter. An aerodynamic decelerator 20, such as a parachute, provides a drag force to keep the cord 16 taut following ejection.

Receptions at 18 of the emitted light and sound signals are transmitted to a remote telemetry receiver 22, illustrated as being on the ground but which could be at other remote locations such as on a satellite, where the reception is recorded on a recorder 24. The time lapse between reception of the light signal and reception of the sound signal as recorded at the recorder 24 is equivalent to the time lapse required for the sound signal to travel the distance L from the light and sound emitting device 12 to the sound signal receiver at 18. Applying the well known formula $C = V + L/t$, where $V$ is the downward velocity of the parachute in meters/second, $L$ is the distance in meters between the sound source 12 and the sound signal receiver 18, and $t$ is the time in seconds required for the sound to travel distance L, $C$, the speed of sound, can be calculated in meters/second. For air the relationship $C^2 = \gamma RT$; where $\gamma$ and $R$ are constants for a given gas, $C$ is the speed of sound in meters/second, and $T$ is the temperature in degrees Kelvin; simplifies to $C = 20.06 \sqrt{T}$. This relationship permits the temperature to be calculated when the speed of sound $C$ is determined at a particular altitude. Ground radar 26 tracks and records the movement of the apparatus 10 in the atmosphere providing data on the spatial position and the horizontal and vertical velocity of the apparatus 10 at the point in time that the sound signals are emitted.

In a modified form of the apparatus shown in FIG. 1, the unit 18 receives the sound signal through the atmosphere and transmits the reception of the sound signal to telemetry receiving equipment 22 located on the ground where it is recorded at 24. Prior to detecting the sound signal in this manner, the unit 18 detects the sound signal which was initiated by the sound emitting device 12 through the cord 16. The reception of this signal received through the cord is transmitted to telemetry receiving equipment 22 on the ground where it is recorded at 24. The time required for the signal to travel the known length L through the cord can be measured. This datum is then used to determine when the initiation of the sound signal took place, thus enabling calculation of the time required for the sound signal to travel distance L through the atmosphere. From the measured time lapse for the sound signal to travel distance L in the atmosphere, application of the above mentioned formulas will result in the measurement of the speed of sound and thus the derivative temperature at the particular altitude can be calculated.

In FIG. 2, another modified form of the apparatus is generally indicated at 10a. A cord 16a supports a unit 18a a known distance $L_2$ below the top portion of the parachute 20a. The unit 18a consists of a sound emitting device, a sound receiving device, an actuating device such as a timer, and a telemetry transmitter.

In the use of the apparatus 10a, the timer initiates the sound signal which is simultaneously detected by the sound signal receiver and transmitted to the remote telemetry receiver 22a and recorded at recorder 24a. The same sound signal travels the distance $L_2$ to the decelerator 20a where the signal is reflected back to the sound receiver at 18a, transmitted to the remote telemetry receiver 22a and recorded at recorder 24a.

Tracking means, such as radar 26a located on the ground, tracks and records the position and velocity of the apparatus 10 through the atmosphere.

In FIG. 3, another preferred embodiment of the invention is shown generally at 10b. Timer 14b triggers the sound emitting device 12b emitting sound signals. A cord 16b supports sound receiving devices 17 and 18b positioned a distance $L_3$ apart. Transmitters located at 17 and 18b transmit reception of the sound signal to telemetry receiving equipment 22b where such reception is recorded on a recorder 24b located on the ground. The time lapse recorded is equivalent of the time lapse for a sound signal to travel distance $L_3$ from the sound receiving device at 17 to the sound receiving device at 18b. Application of the above-mentioned well known formulas allows the temperature at a particular altitude to be determined.

An aerostatic accelerator such as a balloom 19 supports the apparatus in the atmosphere thereby permitting deployment of the apparatus at ground level.

From the above description it is seen that this invention provides simple and easy to operate apparatus 10 which can measure atmospheric temperatures at high altitudes. It is only necessary to propel the apparatus 10 to the desired altitude, deploy the decelerator 20, and actuate the sound emitting device 12. A telemetry transmitter 18 transmits reception of the respective light and sound signals to receiving equipment where the reception is recorded on a recorder 24. Radar 26 tracks the descent of the apparatus providing vertical and horizontal velocity data as well as the position of the apparatus at each temperature measuring point. Using accepted formulas, the speed of sound can be calculated and thus the atmospheric temperature can be determined at the particular altitude. The information recorded at 24 is also useful for other purposes.

It is to be understood that the balloon 19 and the parachute 20 can be used interchangeably in the various illustrated forms of the invention. Also the telemetry receiver 22 and recorder 24 can be on the ground, in the suspended apparatus, or on an appropriate satellite or other space vehicle in all forms of the invention. Also, the conversion of raw data to temperature data can be accomplished at a ground station, another remote station or "on-board" with appropriate equipment and communication of the necessary raw data to the chosen station.

What is claimed is:

1. In apparatus for determining atmospheric temperatures which includes a device for emitting a sound signal, a sound receiving device for receiving a sound signal from said emitting device, aerodynamic decelerator means movably positioning said devices in the atmosphere, means fo detecting the initiation of a sound signal at the emitting device, means for detecting the reception of said sound signal at the receiving device, and means operable to continuously record the position of said sound emitting and receiving devices in the atmosphere;

the improvement comprising: cord means mounted on and extending away from said decelerator means, and sound emitting and sound receiving devices being mounted on said cord means so as to fix the relative positions of said sound emitting and sound receiving devices thereby facilitating the determination of the distance over which said signal has travelled between emission and reception at said sound receiving device.

2. Apparatus according to claim 1 wherein said sound emitting and sound receiving devices are mounted at longitudinally spaced positions on said cord means.

3. Apparatus according to claim 1 wherein said sound emitting and sound receiving devices are mounted at substantially the same position on said cord means.

* * * * *

UNITED STATES PATENT OFFICE
CERTIFICATE OF CORRECTION

Patent No. 4,005,602                    Dated February 1, 1977

Inventor(s)  Wallace J. Wilkie

It is certified that error appears in the above-identified patent and that said Letters Patent are hereby corrected as shown below:

Column 4, line 31, "fo" should read -- for --.

Column 4, line 39, the first "and" should read --said--.

Signed and Sealed this

Twenty-sixth Day of April 1977

[SEAL]

Attest:

RUTH C. MASON  
Attesting Officer

C. MARSHALL DANN  
Commissioner of Patents and Trademarks